US012156313B2

(12) United States Patent
Graff et al.

(10) Patent No.: US 12,156,313 B2
(45) Date of Patent: Nov. 26, 2024

(54) CONTROLLING NETWORKED DIMMABLE LUMINAIRES BASED ON ENERGY CONSUMPTION

(71) Applicant: APPLETON GRP LLC, Rosemont, IL (US)

(72) Inventors: Timothy E. Graff, Arlington Heights, IL (US); Ravindra Viraj Gurjar, Pune (IN); Jacob Zemba, Derry, PA (US); Edward Brann, Okemos, MI (US)

(73) Assignee: APPLETON GRP LLC, Rosemont, IL (US)

( * ) Notice: Subject to any disclaimer, the term of this patent is extended or adjusted under 35 U.S.C. 154(b) by 200 days.

(21) Appl. No.: 17/834,590

(22) Filed: Jun. 7, 2022

(65) Prior Publication Data

US 2023/0199933 A1   Jun. 22, 2023

(51) Int. Cl.
H05B 47/00 (2020.01)
H05B 47/11 (2020.01)
H05B 47/14 (2020.01)
H05B 47/155 (2020.01)
H05B 47/16 (2020.01)
H05B 47/165 (2020.01)
H05B 47/17 (2020.01)
H05B 47/19 (2020.01)

(52) U.S. Cl.
CPC ........... *H05B 47/14* (2020.01); *H05B 47/155* (2020.01); *H05B 47/16* (2020.01); *H05B 47/165* (2020.01); *H05B 47/17* (2020.01); *H05B 47/19* (2020.01)

(58) Field of Classification Search
CPC ........ H05B 47/00; H05B 47/11; H05B 47/14; H05B 47/16; H05B 47/165; H05B 47/17; H05B 47/19
See application file for complete search history.

(56) References Cited

U.S. PATENT DOCUMENTS

2012/0235579 A1*  9/2012  Chemel .................. F21V 29/60
                                                           315/152
2017/0374722 A1* 12/2017  Beiner ................. H05B 47/115
2018/0139809 A1*  5/2018  Pandharipande ...... H05B 45/12

FOREIGN PATENT DOCUMENTS

EP          2 838 322 A1        2/2015

OTHER PUBLICATIONS

Extended European Search Report for Application No. 22213023.9, dated Apr. 21, 2023.

* cited by examiner

*Primary Examiner* — Thai Pham
(74) *Attorney, Agent, or Firm* — MARSHALL, GERSTEIN & BORUN LLP

(57) ABSTRACT

Luminaires provide illumination (in some cases, in a coordinated manner with other nodes of a luminaire network) in an industrial process plant and may include one or more environmental sensors to detect various environmental (e.g., ambient) conditions within the process plant. The luminaires may be dimmable, and may be configured to sample light intensity of light provided by the luminaires (e.g., by detecting a dimmer a setting or by actively sensing the light). The luminaires may transmit the sampled light intensities to luminaire manager device(s). The luminaire manager device(s) may calculate energy usage and/or energy savings. The luminaire manager device(s) may generate reports regarding the energy usage and/or energy savings. The luminaire manager device(s) may implement control of the luminaires based on the energy usage and/or energy savings (e.g., to drive energy usage down to a desired level).

13 Claims, 7 Drawing Sheets

| | One Year Environmental Impact ⑦ | | | |
|---|---|---|---|---|
| 702 | Reduction Of kWh | 23699.14 kWh | Acres Of Trees Planted: | 21.76 | 708
| 704 | Reduction Of Carbon Dioxide Emissions: | 16.76 Metric Tons 36939.05 Pounds | Reduction Of Coat Emissions: | 8.37 Metric Tons 18452.96 Pounds | 710
| 706 | Electricity Saved (Average Household Usage For 1 Year): | 2.84 | Fewer Miles Driven (By Average Passenger Vehicle): | 41576.40 | 712

CONTROLLING NETWORKED DIMMABLE LUMINAIRES BASED ON ENERGY CONSUMPTION

CROSS-REFERENCE TO RELATED APPLICATIONS

The present disclosure is a nonprovisional application claiming priority to Indian application Ser. No. 202121059989 filed on Dec. 22, 2021, the disclosure of which is hereby incorporated herein by reference in its entirety.

FIELD OF THE DISCLOSURE

This disclosure generally relates to monitoring energy consumption by networked dimmable luminaires in a luminaire network for an industrial environment and, more particularly, to controlling the networked dimmable luminaires based on the monitored energy consumption.

BACKGROUND

The background description provided within this document is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

Luminaires, lighting units, and light fixtures may provide general, ambient light, task or focused light, and/or emergency lighting within industrial environments such as industrial process plants, manufacturing facilities, oil refineries, power-generating systems, mines, warehouses, buildings, and the like. In some instances, these industrial environments are hazardous environments. Accordingly, luminaires, lighting units, and light fixtures may be required to be intrinsically safe and/or explosion proof (e.g., to prevent ignition and/or explosion of hazardous atmospheric mixtures such as flammable gases and/or dust, to protect electronics within the luminaire from being compromised or damaged, to contain any explosion that may occur, etc.). Generally speaking, intrinsically safe and/or explosion proof luminaires, lighting units, and light fixtures are designed to limit undesirable and/or dangerous effects of thermal and/or electrical energy generated during both their normal use and maintenance, as well as during fault conditions.

Known luminaires, lighting units, and light fixtures in hazardous and/or in non-hazardous industrial environments may include or be attached to one or more sensors that sense, detect, and/or measure conditions in the environment in which the luminaires, lighting units, and light fixtures are located (e.g., ambient light, temperature, humidity, etc.). Within industrial environments, some smart luminaires, lighting units, and light fixtures may cooperate with process control systems to route process control messages on behalf of the process control system between various process control devices, components, and nodes, thereby leveraging the luminaires and the connected luminaire network to deliver process control messages within an industrial environment.

In many cases, luminaires are always on, operating in a 24/7 state of operation through a process plant. This 24/7 operation may be desirable because many processes run continuously. At any given time, plant personnel may be in the field inspecting equipment, field devices, or other workers. As a result, it may be imprudent and/or unsafe to allow workers to simply turn off luminaires.

SUMMARY

Luminaires may be installed in various indoor and/or outdoor locations of an industrial environment to provide ambient, directed, task, and/or emergency lighting. The luminaires may be dimmable to provide a range of desired light intensities. The luminaires may be powered primarily via mains power, such as alternating-current (AC) electric power delivered to the industrial environment via an electrical power grid infrastructure or other outside electrical power source. Wiring which delivers power to the various luminaires is typically enclosed and shielded from the harsh industrial environment, e.g., behind a wall or ceiling, within conduit or other physical shields, etc. Each luminaire may include a battery or other local power storage device, which the luminaire may utilize in the event of mains power loss. Luminaires may be stand-alone luminaires, or may be communicatively connected via a connected luminaire network to perform and coordinate the execution of smart lighting features within the industrial environment. For example, the luminaires may communicate with other luminaires and other nodes (such as back-end servers, data historians, user interface devices, etc.) via a luminaire network to coordinate illumination functions within the environment, transmit status and/or other administrative messages related to lighting activities, etc. The luminaire network may include wireless and/or wired portions, for example. In some embodiments, a luminaire may include one or more environmental sensors which detect and measure environmental or ambient conditions in the area in which the luminaire is disposed. For example, a luminaire may include an ambient temperature sensor, an ambient light sensor (e.g., visible light), a humidity sensor, a heat sensor, a motion sensor, one or more gas sensors (e.g., for various gases), a sound or noise sensor, a vibration sensor, an air flow sensor, etc. Luminaires which are outfitted with sensors may transmit sensor data to a back-end server of the luminaire network, for example. A luminaire may utilize the light sensor to sample light intensity provided by the luminaire (e.g., verifying a dimmer setting at the luminaire). The luminaire may transmit sampled light intensities to one or more luminaire managers. In some instances, the sampled light intensities are sampled by observing a dimmer setting at the luminaire (e.g., rather than directly sensing a light intensity via a light sensor). The luminaire manager(s) may calculate energy usage(s) and/or energy savings (e.g., for any desired number of luminaires and/or sets/zones of luminaires) based on the sampled light intensities received from the one or more luminaires and/or one or more sets of luminaires. The luminaire manager device(s) may generate reports regarding the energy usage and/or energy savings. The luminaire manager device(s) may implement control of the luminaires based on the energy usage and/or energy savings (e.g., to drive energy usage down to a desired level).

Many industrial environments serviced by the luminaires utilize one or more wired and wireless process control networks (also referred to interchangeably herein as "process control communication networks," "process control data networks," "industrial networks," "industrial communication networks," or "industrial data networks") to send and receive process control messages (e.g., data, commands, statuses, and the like) to and from various components, devices, and/or nodes to thereby control an industrial process. For example, a process control system (PCS) within an industrial environment may utilize the one or more process control wireless networks, which may be mesh wireless networks, to transmit and receive process control and other related messages. Components, devices, and/or nodes within the industrial environment may transmit messages via the one or more wireless networks, typically by utilizing a standardized protocol that is particularly designed for industrial control applications. That is, the industrial wireless protocol utilized by an industrial wireless communication network enables the timing and delivery of process control messages to and from receiving and sending nodes in industrial environments so that nodes may operate on the message contents within specified time intervals to control respective portions of the process. Specifically, the delivery of process control messages via the wireless network is scheduled and controlled across the network so that the industrial process does not become unstable and the wireless network does not become overloaded and thereby cause errors, faults, uncontrolled behaviors, and in some cases, dangerous consequences such as explosions, leaks, fires, and the like, which may lead to loss of equipment and more importantly, loss of human life. An example of such a commonly utilized wireless industrial protocol is WirelessHART; however, any suitable wireless protocol which supports the scheduling and time-synchronization of the delivery and reception of process control messages between nodes of the network to control an industrial process and thereby manage risk within the industrial environment may be utilized. Generally speaking, a wireless network manager generates or creates a network schedule for the industrial wireless communication network, and the network manager provides respective portions of the schedule to nodes of the wireless network so that each node is configured to access the wireless network at respective scheduled or designated times or time slots to send and/or receive process control related messages, and so that communications between nodes of the industrial wireless communications network are delivered in a coordinated and controlled manner across the network.

In some industrial process plants, at least a part of the wireless portion of the luminaire network and the wireless portion of process control network intersect or are integral. Both lighting communications and process control communications may be delivered via the intersecting/integral wireless portions, and the network manager may manage the scheduling for both the lighting communications and the process control communications via the intersecting/integral wireless portions.

DETAILED DESCRIPTION

Figure 1:
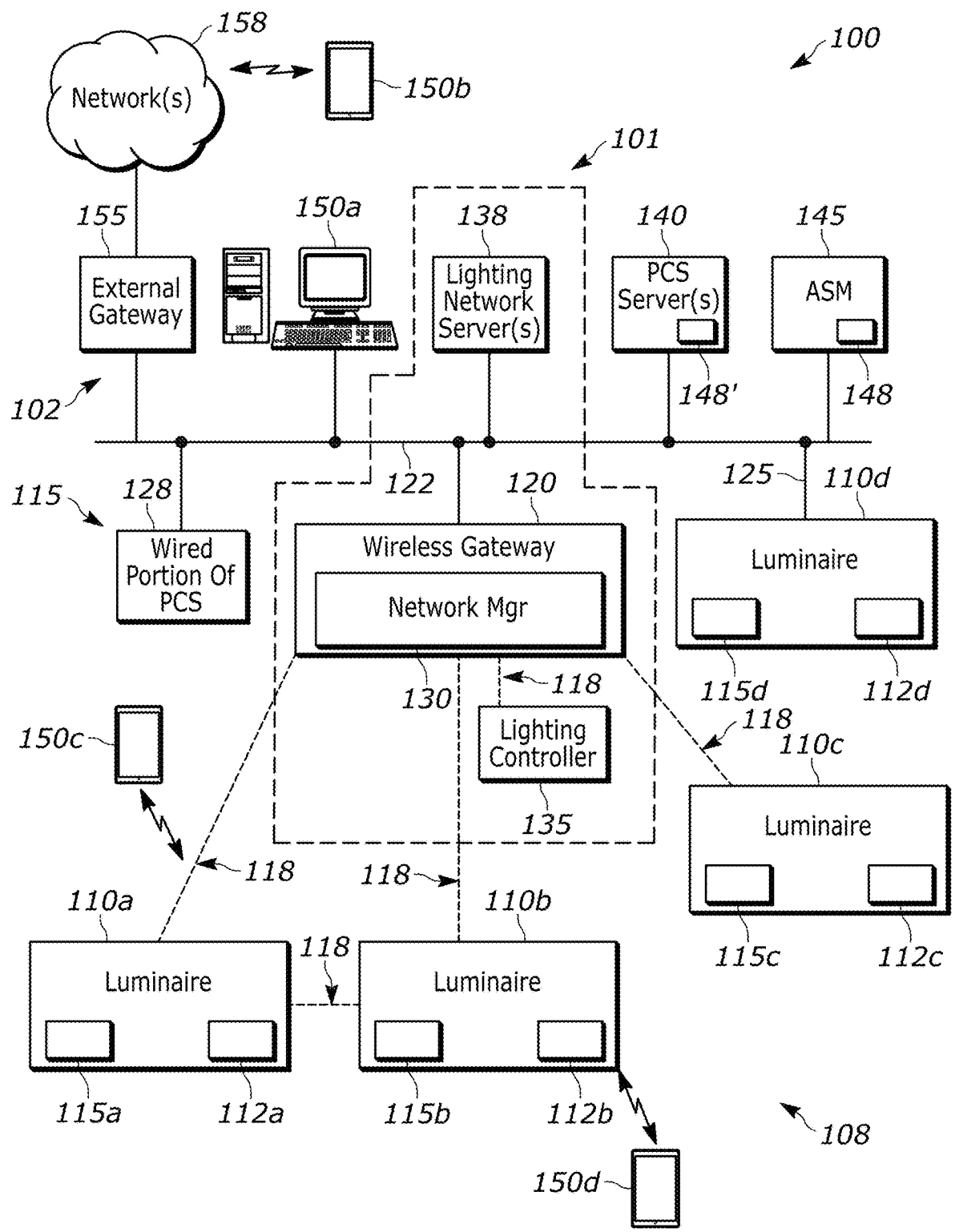
FIG. 1 illustrates an example industrial environment in which one or more luminaire managers may be implemented to receive and analyze light intensities sampled from luminaire(s) by utilizing the systems, methods, luminaires, and/or techniques of the present disclosure.

FIG. 1 illustrates an example industrial environment 100 in which one or more luminaire manager devices 101 (alternatively, "luminaire managers 101," "devices 101," or "managers 101") may be configured to (i) monitor energy usage or consumption by networked dimmable luminaires 110 in a lighting or luminaire network 108 for an industrial environment and (ii) facilitate control of the luminaires 110 in accordance with the monitored energy usage. For any luminaire or set of luminaires, the luminaire managers 101 may calculate the energy usage or consumption based on a light intensity or a series of light intensities provided by the luminaire or set of luminaires.

Light intensity may be measured or quantified in lumens. For example, a 60-watt luminaire may be configured to provide roughly 840 lumens at maximum intensity, at which it consumes 60 watts per hour or 0.06 kWh.

The energy usage or consumption may be quantified in any suitable metric, such as kWh or as a percentage relative to a maximum. For example, if the previously mentioned 60-watt luminaire is dimmed to 50%, the luminaire manager devices 101 may expect it to consume half the energy it consumes at maximum capacity (e.g., 03 kWh instead of 0.06 kWh). Likewise, if a light intensity of 420 lumens is detected or sensed for light projected by the luminaire, the luminaire manager 101 may assume the luminaire is consuming roughly half the energy usage expected at maximum capacity (e.g., 50% of 0.06 kWh=. 03 kWh). As noted, energy usage may be characterized in relative terms. For example, if the previously mentioned luminaire is dimmed to provide roughly 554 lumens and consumes roughly 40 watts in an hour, the luminaire may be characterized as having an energy usage of 66% over that hour.

The luminaire manager 101 may obtain multiple samples per hour and may calculate an average for each hour. For example, if 6 samples of 0.03 kWh and 6 samples of 0.06 kWh are obtained in a given hour, the luminaire manager 101 may calculate an average energy usage of 0.045 kWh for that hour.

In some instances, a threshold may exist for a luminaire or set of luminaires. The threshold may be quantified in absolute terms (e.g., in kWh) or in relative terms (e.g., as a percent). For example, the previously mentioned luminaire may have a threshold of 75%. In some embodiments, this may indicate that the luminaire should never exceed 75% of maximum light intensity. In some embodiments, the threshold indicates that the luminaire should never exceed an average of 75% over a given time period (e.g., for 24 hours). For example, if the luminaire operates at 0% for 12 hours and 100% for 12 hours, the luminaire manager may determine that average energy usage for the luminaire over 24 hours is 50%, which is below a threshold of 75%. In some instances, the luminaire managers 101 may track a rolling average energy consumption (e.g., for the last hour, last 12 hours, last 24 hours, etc.). When the rolling average exceeds the threshold, the luminaire managers 101 may dim or deactivate the luminaire to bring the rolling average down. Depending on how the luminaire manager 101 is configured, the luminaire manager 101 may aggressively or conservatively respond to a threshold being exceeded.

If desired, an energy savings may be calculated for a luminaire or set of luminaires. For example, if a luminaire or set of luminaires is calculated to have an energy usage of 66% for an hour, the energy savings would be 34% for that hour.

In some instances, a report may be generated based on the energy usage and/or savings metrics calculated by the luminaire manager devices 101. The report may include a "global" energy usage and/or savings indicating totals for a plant or for a set of plants over a desired time period. The report may include energy usage/savings for each of a number of zones or sets (e.g., each zone or set being particular to a floor or area of a plant). Particularly if the global energy usage is higher than expected, this may enable an operator or the luminaire manager devices 101 to determine which zone or zones are the biggest contributors. The report may include energy usage for each individual luminaire if desired. The report may be displayed at any of the user devices 150 shown in FIG. 1 (described in more detail below). In some instances, the user may deactivate or dim one or more luminaires or sets of luminaires in response to viewing the report.

As noted, the luminaire manager devices 101 may implement control (e.g., automatically without user intervention) of the luminaires 110 based on the calculated energy usage and/or savings metrics. Control may be implemented by adjusting one or more control parameters associated with luminaires or sets of luminaires (e.g., brightness settings or on/off settings). Control may be implemented by analyzing a set of factors associated with luminaires or sets of luminaires (e.g., detected motion at the luminaires, ambient light at the luminaires, worker schedules, etc.).

Advantageously, the described systems, methods, luminaires, and techniques may be implemented to reduce the total time for which luminaires are on, to reduce the frequency and length of high-intensity luminaire use, and to more selectively and intelligently provide light when and where needed. The described systems and techniques enable more precise, more on-demand, and more energy-efficient control of a luminaire network, resulting in cost-savings and environmentally-friendly operation of luminaires in industrial environments.

In some situations, the example industrial environment may be disposed within a hazardous environment 100, such as an industrial process plant, a manufacturing facility, an oil refinery, a power-generating system, a mine, etc. in which components (such as luminaires, communication networks, process control devices, etc.). As interchangeably utilized herein, the terms "luminaire," "lighting unit," and "light fixture" generally refer to an electrically powered component which operates to supply general or ambient light and/or task or focused light in the portion of the electromagnetic spectrum that is visible to the human eye, e.g., from about 380 to 740 nanometers.

As shown in FIG. 1, the industrial environment 100 includes a back-end environment 102 and a field environment 105. In some industrial environments 100, such as those of an industrial process plant, a manufacturing facility, an oil refinery, a power-generating system, a mine, etc., the field environment 105 is a hazardous environment. Accordingly, components disposed within the hazardous field environment 105 (e.g., luminaires, communication network components, process control devices, etc.) must comply with all standards and/or regulatory rules that are applicable to the particular hazardous environment in which they are disposed to limit undesirable and/or dangerous effects of thermal and/or electrical energy generated during both their normal use and maintenance, as well as during fault conditions.

As shown in FIG. 1, the industrial environment 100 is serviced by the luminaire network 108 which may provide general lighting, ambient light, task or focused lighting, and/or emergency lighting within the industrial environment 100. The luminaire network 108 includes four luminaires 110a, 110b, 110c, 110d which are configured according to one or more of the techniques described herein and which are disposed at various physical locations within the field environment 105. For example, each of the luminaires 110a, 110b, 110c, 110d includes a circuit 112a, 112b, 112c, 112d (e.g., ASICs, processors, and/or memories storing computer-executable instructions to be executed by processors of the luminaires) configured to cause the luminaires to provide illumination, to detect or sense and report one or more environmental or ambient conditions, as well as to perform other actions and techniques if desired. To this end, each luminaire 110a-110d includes one or more respective environmental sensors 115a-115d which detect the environmental or ambient conditions. For example, environmental sensors 115a-115d may include ambient temperature, heat, ambient light, humidity, motion, particular gas, sound or noise, vibration, air flow, and/or other types of sensors or detectors. Each luminaire 110a-110d need not include a same or even similar types of sensors. For example, luminaires 110a, 110b may each include a gas sensor for a specific type of gas, and luminaires 110c, 110d may each omit any gas sensor, while luminaires 110a, 110c may each include an ambient temperature sensor and luminaires 110b, 110d may each omit any ambient temperature sensors. Further, some luminaires of the luminaire network 108 may not include any environmental sensors (not shown).

In FIG. 1, each of the luminaires 110a, 110b, 110c is a respective node of a wireless portion 118 of the luminaire network 108 (wireless links of which are denoted in FIG. 1 by the dashed lines), and may include a radio, circuit, or any suitable communication interface to enable wired or wireless connected to the network 108. In an embodiment, the wireless portion 118 of the luminaire network 108 (which is interchangeably referred to herein as the "wireless luminaire network 118") may be a wireless mesh network which utilizes a time-synchronized wireless protocol. The wireless luminaire network 118 may include a wireless gateway 120 which communicatively connects, e.g., via a data highway or backbone 122, the wireless luminaires 110a, 110b, 110c to a wired portion 125 of the luminaire network 108, which includes one or more wired luminaires 110d, and/or to luminaire network components disposed in the back-end environment 102. The data highway or backbone 122 may be an Ethernet, broadband fiber optic, or any suitable type or types of wired backbone(s), for example.

In some configurations of the industrial environment 100, at least part of the wireless portion 118 of the luminaire network 108 may include, intersect, or be integral with a wireless process control network to which process control wireless nodes (not shown in FIG. 1) are communicatively connected, where the process control wireless nodes are included in a process control system (PCS) servicing the industrial environment 100, and where the process control wireless nodes are operable, via the PCS, to control an industrial process within the industrial environment 100. Examples of process control wireless nodes may include wireless field devices, wireless adaptors servicing respective wired field devices, routers, and/or other types of process control devices. A wireless gateway 120 servicing the wireless process control network may communicatively connect wireless process control devices and a wired portion 128 of the process control system, e.g., via the data highway or backbone 122 utilized by the luminaire network, or via another data highway or backbone (not shown). The wired portion 128 of the PCS may be disposed at least in part in the field environment 105 of the industrial environment 100, and may include, for example, controllers, I/O devices, marshalling equipment, wired field devices, and/or other types of wired process control devices.

In the embodiment shown in FIG. 1, the depicted wireless network 118 services both wireless luminaires 110a, 110b, 110c of the luminaire network 108 and wireless process control devices (not shown) of the process control system (PCS). Accordingly, FIG. 1 depicts the wireless gateway of the luminaire network and the wireless gateway of the PCS as being an integral wireless gateway 120, and both the luminaire network 108 and the process control network share a common data highway 122. In other embodiments, though, the wireless gateway of the PCS and the wireless gateway of the luminaire network may be different or separate wireless gateways 120, and/or the luminaire network 108 and the process control network may utilize different data highways 122 via which to respectively connect respective field environment components 105 and respective back-end environment components 102.

As mentioned above, the wireless portion 118 of the luminaire network 108 may utilize a time-synchronized wireless protocol such as WirelessHART or other suitable wireless protocol to deliver control, data, and other types of messages to, from, and between wireless luminaires 110a-110c. Accordingly, the wireless portion 118 of the luminaire network 108 includes a wireless network manager 130 which, as denoted in FIG. 1, is included in the wireless gateway 120. (In other embodiments, though, the wireless network manager 130 may be a separate node of the wireless luminaire network 118 and may not be integral with the wireless gateway 120.) As previously discussed, the wireless network manager 130 performs administrative and coordination tasks related to the wireless luminaire network 118, such as generating, re-organizing, updating, and administrating a network schedule, distributing respective portions of the network schedule to respective luminaires 110a-110c, managing time-synchronization among wireless luminaires 110a-110c, delivering messages between the wireless portion 118 of the luminaire network 108 and the back-end environment 102 and/or the wired portion 125 of the luminaire network 108, for example. In configurations in which the wireless portion 118 of the luminaire network 108 and the wireless process control network are at least in part an integral wireless network, e.g., as depicted in FIG. 1, both the wireless portion of the luminaire network 108 and the wireless process control network may be under the direction of the same network manager 130, e.g., for scheduling, time synchronization, and other such purposes.

Generally speaking, the wireless luminaire nodes 110a, 110b, 110c and the wired luminaire node(s) 110d of the luminaire network 108 operate to coordinate and control illumination within the industrial environment 100, as well as to perform other tasks related to providing illumination, e.g., by sending and receiving lighting control, data, and other types of messages via the luminaire network 108. In embodiments, the luminaire network 108 includes a lighting controller 135 which coordinates lighting/illumination activities of the luminaire network 108 and administration thereof. The lighting controller 135 may be included in any desired node of the luminaire network 108, for example, in a back-end luminaire network server 138, in a stand-alone wired or wireless node of the luminaire network 108, etc. In some examples, the lighting controller 135 may be included in the wireless gateway 120. Typically, though, the lighting controller 135 typically is communicatively connected to the data highway 122. The lighting controller 135 may be in communicative connection with the network manager 130, and in some embodiments, the lighting controller 135 and the network manager 130 are an integral unit (not shown). If desired, the lighting controller 135 may be distributed in nature, implemented at multiple coordinating devices (e.g., at the luminaires).

The back-end environment 102 of the industrial environment 100 is protected from the harsh conditions of the field environment 105, and as such, various components of back-end may be safely disposed in the back-environment 102. For example, one or more back-end servers 138 of the luminaire network 108 may be disposed in the back-end environment 102, and may provide functionalities to support the coordinated illumination provided by the luminaire network 108, such as configuration, control instructions, data historian, analytics, reporting, etc. Additionally, one or more back-end servers 140 of the process control system (PCS) may be disposed in the back-end environment 102, and may provide functionalities which support the real-time operations of the PCS such as configuration, virtual control, data historian, analytics, reporting, etc. It is noted that although the luminaire network back-end servers 138 and the PCS back-end servers 140 are illustrated in FIG. 1 as being independent sets of servers, in some embodiments (not shown), at least a portion of the luminaire network back-end servers 138 and at least a portion of the PCS servers 140 may be implemented as one or more integral servers. Further, in embodiments, at least a part of the luminaire network servers 138 and/or at least a part of the PCS back-end servers 140 may be physically disposed in locations which are physically remote from the environment 100, such as at remote server banks, in a cloud computing system, etc. As shown in FIG. 1, both the PCS back-end servers 140 and the luminaire network back-end servers 138 may be communicatively connected to the data highway 122.

Additionally, the back-end 102 of the industrial environment 100 may include an Asset Management System (ASM) 145 of the process plant. As shown in FIG. 1, the ASM 145 may be communicatively connected to the data highway 122, however, the communicative connection between the ASM 145 and the data highway 122 is not required. Generally speaking, while the PCS servers 140 are primarily (but not exclusively) directed to run-time operations of the process plant, the ASM 145 is primarily (but not exclusively) directed to managing the risk of failure of assets of the process plant, where assets include physical equipment and optionally software assets. For example, lifetimes and scheduled or routine maintenance, replacement, and upgrades of various assets may be tracked and managed via the ASM 145. As shown in FIG. 1, the ASM 145 stores an indication of a physical layout 148 of the process plant which depicts or otherwise identifies physical locations of assets, devices, equipment, piping, aisles, walkways (raised or floor level), rooms, walls, floors, ceilings, doors, and other physical contents and characteristics of the plant. The physical layout 148 may be a three-dimensional physical layout, and as such may identify the physical locations of the contents and characteristics of the plant via three-dimensional coordinates, such as GPS (Global Positioning System) coordinates or other suitable coordinates. The layout 148 may be generated based on one or more maps, drawings, diagrams, blueprints, or other types of plans of the process plant, such as P&ID (Piping and Instrumentation Diagrams), construction blueprints, etc., for example. In some arrangements of the industrial environment 100, a copy of at least a portion of the physical layout 148 of the plant may be stored in the PCS servers 140, as denoted in FIG. 1 by the reference 148'. For example, a copy 148' of at least a portion of the physical layout 148 may be transmitted by the ASM 145 to the PCS servers 140 via the data highway 122, the copy 148' may be manually transferred from the ASM 145 to the PCS servers 140, or the ASM 148 may store the copy 148' in a data storage device (not shown in FIG. 1) which is accessible to both the ASM 145 and the PCS servers 140, and the PCS servers 140 may retrieve the stored copy 148' from the data storage device.

The back-end environment 102 of the industrial environment 100 may also include one or more locally or remotely disposed user interface devices 150a-150b, which may include locally or remotely disposed computing devices, such as desktops, laptops, tablets, phones, smart devices, connected vehicle devices, and/or other types of Personal Electronic Devices (PEDs). For example, one or more user interface devices 150a utilized respectively by operators and/or by configuration engineers of the process control system and/or of the luminaire network 108 may be locally connected in a wired manner to the data highway 122. One or more user interface devices 150b utilized respectively by operators and/or by configuration engineers of the process control system and/or of the luminaire network 108 may be disposed remotely from the industrial environment site 100, and may be communicatively connected to the data highway 122 via a system or external gateway 155 and one or more public and/or private communications or data networks 158, for example. Additionally or alternatively, one or more user interface devices 150c, 150d may be utilized by personnel located within the field environment 105 of the industrial environment 100, where the devices 150c, 150d may be communicatively connected to the wireless luminaire network 118 or via direct local means. For example, the user interface devices 150c may be communicatively connected to the wireless luminaire network 118 and/or the wireless process control networks (or nodes thereof) via networking means, e.g., by utilizing a generic last-mile wireless local network (e.g., Wi-Fi, cellular, short-range wireless protocols, etc.) proximate to or included in the field environment 105, the one or more public and/or private networks 158, and the system gateway 155. In another example, the user interface device 150d may be communicatively connected to a wireless luminaire 110b via a short-range wireless protocol (e.g., Bluetooth, NFC, etc.), and the wireless luminaire 110b may deliver communications to/from the user interface device 150b and the wireless luminaire network 118 and/or the wireless process control network.

Further, as shown in FIG. 1, each user interface device 150a-150d may execute applications, thin clients, or other types of user interfaces, each of which services the process control system, the lighting system 108, or both systems. For example, the user interface device 150a which is physically disposed in the back-end environment 102 of the industrial environment 100 may include (and execute) one or more process control system-specific user interface applications and/or one or more lighting system-specific user interface applications. In another example, a remote user interface device 150b (e.g., which is utilized by remotely located personnel) may execute one or more applications, thin clients, etc. corresponding to one or more process control system user interfaces, one or more lighting system interfaces, or both. In still another example, user interface device 150c may be configured to only service the process control system and not the lighting system, and thus executes process control user interfaces (e.g., which may communicate with the process control system via wireless network 118) and not lighting system user interfaces. User interface device 150d may be configured to service only the lighting system and not the process control system, and thus executes lighting system user interfaces (e.g., which may communicate with the lighting system via the luminaire network 108) and not process control system user interfaces.

Figure 2:
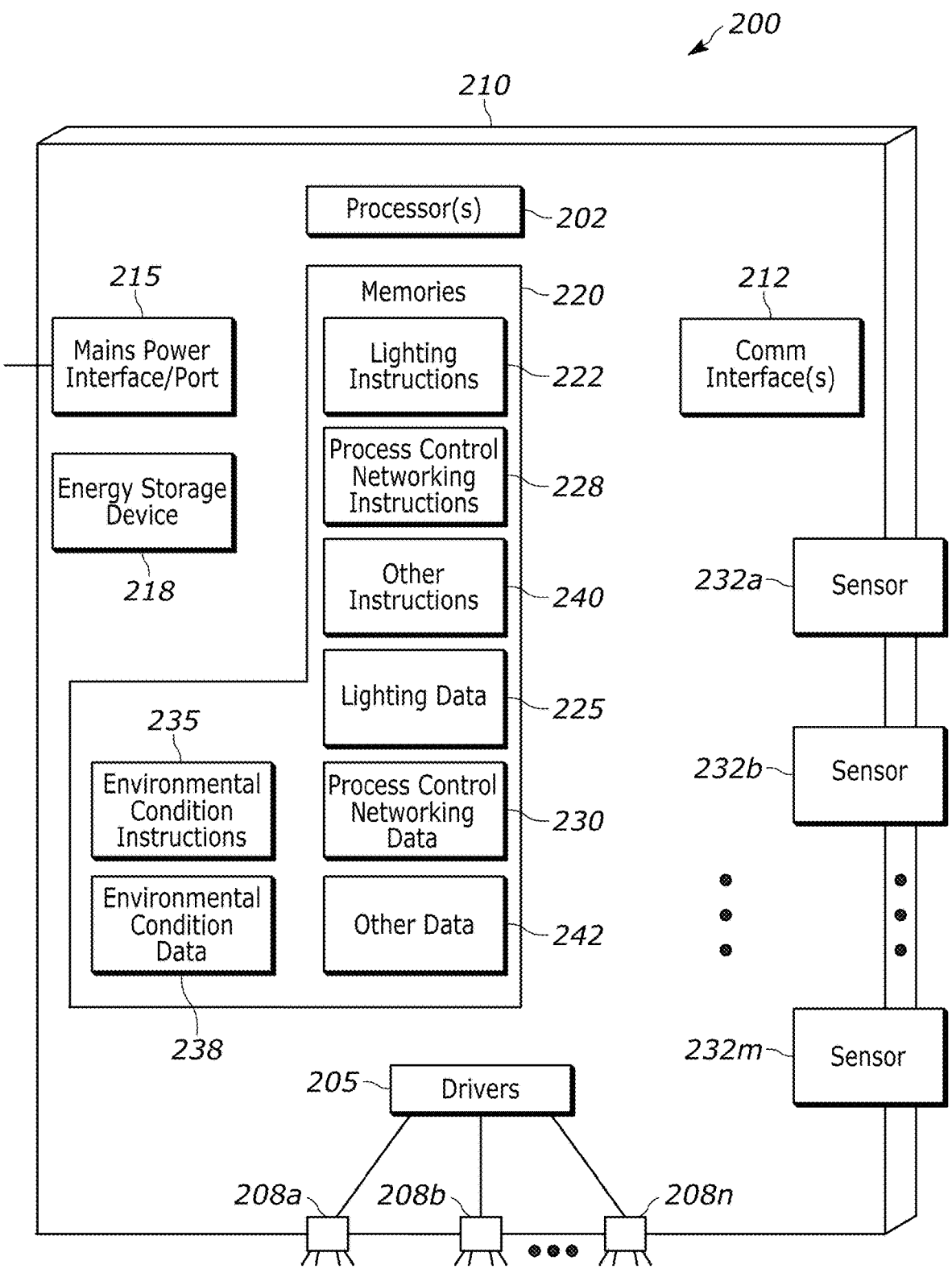
FIG. 2 is a block diagram of an example luminaire or luminaire node that may detect or determine light intensities provided at the luminaire node, that may transmit the light intensities to a luminaire manager, and/or that may be controlled in a manner responsive to a determination that one or more luminaires are consuming too much energy.

FIG. 2 is a block diagram of an example luminaire node 200 that may detect or determine light intensities provided at the luminaire node 200, transmit the light intensities to a luminaire manager, and/or be controlled in a manner responsive to a determination that one or more luminaires in the luminaire network 108 are consuming too much energy.

For example, one or more portions or the entirety of the luminaire node 200 may be included in the luminaire node 110a, 110b, and/or 110c of FIG. 1, or may be included in other luminaires which are communicatively connected via the luminaire network 108. The luminaire node 200 is described with simultaneous reference to FIG. 1; however, this is merely for clarity of illustration and not limitation purposes. For example, instances of the luminaire node 200 maybe utilized in environments other than the industrial environment 100.

The luminaire node 200 includes one or more processors 202, one or more drivers 205 (e.g., for illumination or visible light sources), and one or more illumination or visible light sources 208a-208n that are enclosed in, surrounded by, and/or otherwise protected by an enclosure 210, which may be a hazardous environment enclosure. Additionally, the luminaire node 200 includes one or more communication interfaces 212 via which the luminaire node 200 may communicatively connect to a wireless luminaire network and optionally to a wireless process control network, and thus the one or more communication interfaces 212 may include respective digital signal processors (DSPs), transceivers, antennas, etc. For example, the one or more communication interfaces 212 may include one or more wireless communication interfaces via which the luminaire node 200 wirelessly communicates with the wireless network 118 (e.g., via WirelessHART or other suitable time-synchronized wireless protocol) and optionally with the luminaire network (e.g., via the time-synchronized wireless protocol or some other suitable wireless protocol). In some embodiments, the one or more communication interfaces 212 may include one or more wired interfaces via which the luminaire node 200 communicates in a wired manner with other luminaires and components of the luminaire network 108. In some embodiments, the one or more communication interfaces 212 may include a hybrid wired/wireless communication interface.

The luminaire node 200 includes a mains power interface or port 215 electrically connecting the luminaire node 200 to a source of mains power, which typically is a general-purpose alternating-current (AC) electric supply, such as provided by utility power, an electric grid, a generator, etc. For the most part, during normal operations, the luminaire node 200 may be powered via the mains power received via the mains power interface/port 215. The luminaire node 200 also includes an energy storage device 218 such as a battery, capacitor, or other suitable power storage device which may serve as a back-up source of power, and via which the luminaire node 200 may be powered during certain situations, such as when mains power is disconnected, intermittent, or otherwise not available. Typically, upon detecting that mains power is no longer available via the mains power interface 215, the luminaire node 200 may automatically switch to using the energy storage device 218 as its source of power, and upon detecting that mains power is restored, the luminaire node 200 may automatically return to utilizing mains power as its primary source of energy.

Generally speaking, for the purposes of providing illumination or visible lighting as well as to perform tasks related to illumination/lighting (such as administrative tasks, diagnostics, maintenance operations, etc.), the luminaire node 200 includes one or more memories 220 storing a set of computer-executable lighting instructions 222. The one or more processors 202 may execute the lighting instructions 222 to cause the luminaire node 200 to perform lighting-related tasks, such as instructing the one or more drivers 205 to energize or activate the one or more illumination sources 208a-208n, e.g., individually or independently, and/or as a set or group in a coordinated manner. For example, the executing lighting instructions 222 may instruct the one or more drivers 205 to energize, activate, de-energize, deactivate, brighten, or dim the one or more illumination sources 208a-208n of the luminaire node 200 based on sensor signals or other detected conditions. If the luminaire node 200 is connected to the luminaire network 108 (e.g., in a wireless or wired manner), the executing lighting instructions 222 may instruct the one or more drivers 205 to energize, activate, de-energize, deactivate, brighten, or dim the one or more illumination sources 208a-208n of the luminaire node 200 based on driving commands which are transmitted by the lighting controller 135 of the luminaire network 108 (not shown in FIG. 2) and received at the luminaire node 200 via the communication interfaces 212 and luminaire network 108. In some connected lighting configurations, the one or more processors 202 may execute the lighting instructions 222 to send administrative messages to (and/or receive administrative messages from) the lighting controller 135 via the communication interfaces 212 and the luminaire network 108, such as usage statistics, component status, and the like, to perform diagnostics, etc. Lighting data 225 which the luminaire node 200 utilizes (and in some cases, reads and/or writes) to perform lighting-related functions, activities, and tasks may be stored in the one or more memories 220 of the luminaire node 200. The lighting data 225 may store, for example, the portion of the network schedule (e.g., as generated by and received from the wireless network manager 130) which defines or directs the luminaire node's lighting-related communications, a configuration of the luminaire node 200 as a lighting node within the luminaire network 108 or as a stand-alone luminaire 200, records of lighting events, data, diagnostic results, and/or statistics, and the like.

When the luminaire node 200 serves as a node of the wireless process control system 118, the luminaire node 200 may further include a set of process control networking instructions 228 stored on its one or more memories 220. The one or more processors 202 may execute the process control networking instructions 228 to cause the luminaire node 200 to perform process control networking tasks, such as routing process control messages to and from other process control wireless nodes in accordance with the time-synchronized schedule generated by the network manager 130 of the wireless network 118. For example, when the luminaire node 110a is configured as an instance of the luminaire node 200, the luminaire node may receive, from the PCS servers 140 of the back-end environment 102, process control messages to be routed to other wireless process control devices and may forward (via process control wireless network 118) such messages to/from their respective recipients (e.g., wireless field devices, not shown) in accordance with the network schedule. In a similar manner, when the luminaire node 110c is configured as an instance of the luminaire node 200, the luminaire node 110c may receive process control messages from a wired or wireless process control field device (not shown), and may forward (e.g., via wireless network 118) such messages to their respective recipients in accordance with the network schedule. As such, the memories 220 of the luminaire node 220 store process control networking data 230 to support process control networking tasks performed by the luminaire node 200. For example, the process control networking data 230 may store the portion of the network schedule (e.g., as generated by and received from the wireless network manager 130) which defines or directs the luminaire node's process control message routing activities, a configuration of the luminaire node 200 as a wireless node within the wireless network 118, records of process control networking events, data, and/or statistics, and the like.

As shown in FIG. 2, the luminaire node 200 includes one or more environmental sensors 232a-232m which are communicatively connected to other components of the luminaire 200, e.g., the processor(s), the memories 220, etc. For example, the sensors 232a-232m may be the sensors 110a, 110b, 110c, or 110d of FIG. 1. The one or more environmental sensors 232a-232m may detect, sense, and/or measure one or more environmental conditions (e.g., ambient conditions or conditions of the immediate environment in which the luminaire 200 is physically located), such as ambient temperature, heat, ambient light, humidity, motion, particular gas, sound or noise, vibration, air flow, etc. A single sensor 232x may detect a single environmental condition, or may detect multiple environmental conditions, and each sensor 232x may generate signals, e.g., over time, indicative of the detected condition(s) and optionally indicative of measurement(s) of the detected condition(s). Advantageously, the sensors 232a-232m may be conveniently powered by the mains power 215 and/or the battery power 218 provided to the luminaire 200.

The luminaire 200 also includes a set of environmental condition instructions 235 stored on its one or more memories 220. The one or more processors 202 may execute the environmental condition instructions 235 to cause the luminaire node 200 to obtain, from the signals generated by the one or more environmental sensors 232, data indicative of conditions that have been detected, sensed, and/or measured by the one or more environmental sensors 232 (e.g., environmental condition data 238), and to associate respective timestamps or other suitable indications of respective times at which the environmental condition data 238 was collected or observed. The environmental condition data 238 and corresponding timestamps may be stored in the luminaire memories 222, and/or may be transmitted to the luminaire network server(s) 138, e.g., via the communication interface(s) 212 and the luminaire network 108. For example, the processor(s) 202 may execute the environmental condition instructions 235 to cause the environmental condition data 238 to be transmitted to the luminaire network server(s) 138 in accordance with the time-synchronized schedule generated by the network manager 130.

Of course, the memories 220 of the luminaire node 200 may store other instructions 240 and other data 242 in addition to those related to lighting, process control, and environmental conditions.

Figure 3:
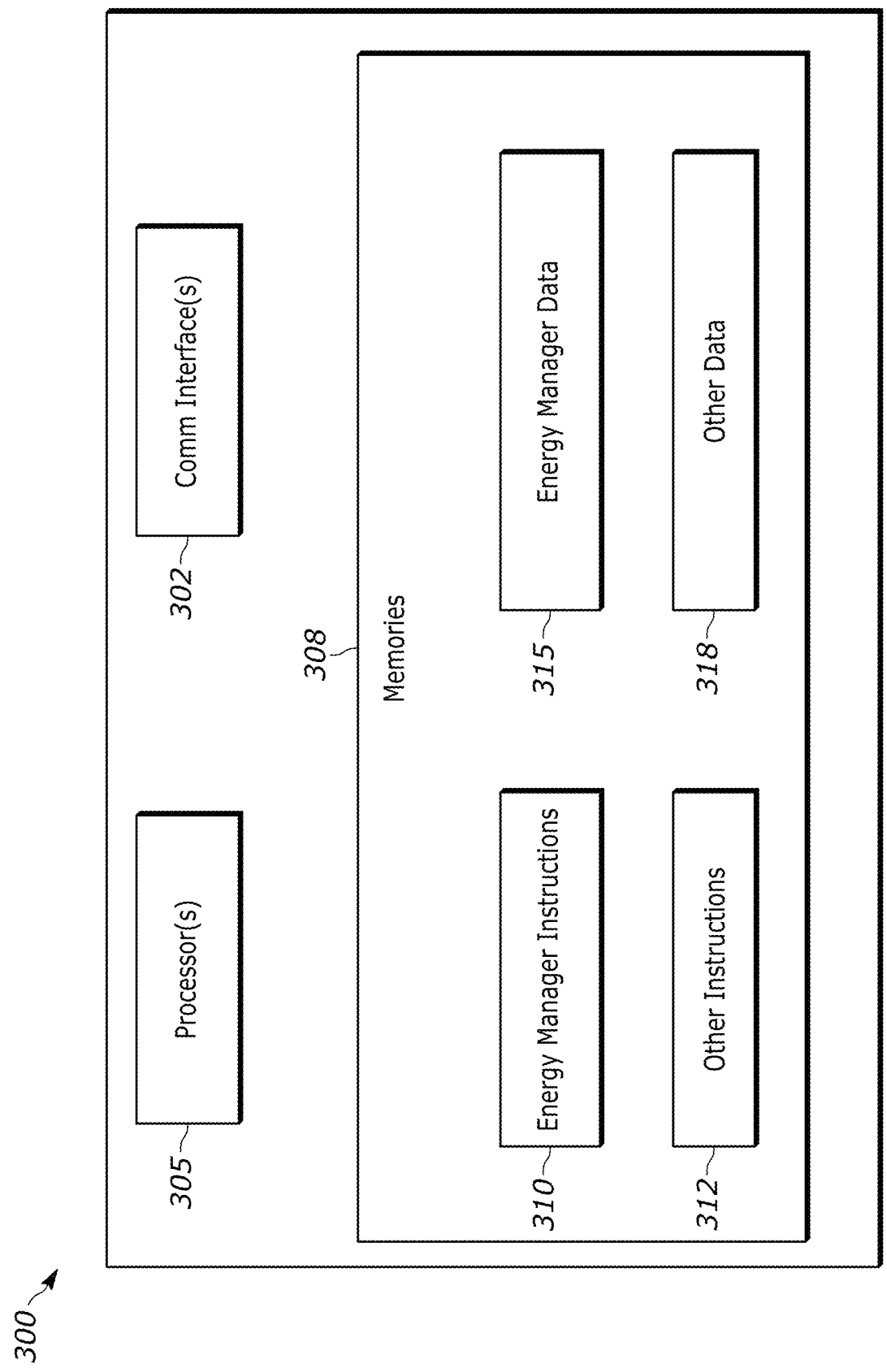
FIG. 3 is a block diagram of an example luminaire manager that is configured to calculate an energy usage or consumption for one or more luminaires, such as those shown in FIGS. 2 and 3, based on light intensities provided by the luminaires and/or to control one or more luminaires based on the calculated energy usage or consumption.

FIG. 3 is a block diagram of an example luminaire manager 300 that is configured to calculate an energy usage or consumption for one or more luminaires based on light intensities provided by the luminaires and/or to control one or more luminaires based on the calculated energy usage or consumption. The luminaire manager 300 may report the calculated energy usage (e.g., via a user interface). In some instances, the luminaire manager 300 may determine that the energy usage exceeds a threshold. In response, the luminaire manager 300 may control some of the luminaires to reduce the energy usage (e.g., to a level below the threshold). If desired, the luminaire manager 300 may calculate energy savings for the one or more luminaires.

Referring to FIG. 1, the luminaire manager 300 may be included in the one or more luminaire network servers 138, in the one or more PCS servers 140, in the wireless gateway 102, or in another set of computing devices which are communicatively connected to the data highway 122 of the industrial environment 100, either locally via a direct connection to the data highway 122, or remotely via the external gateway 155 and one or more external networks 158. For example, the luminaire manager 300 may be included in an Industrial Internet of Things (IIOT) server. For ease of discussion, and not for limitation purposes, the luminaire manager 300 is discussed herein with simultaneous reference to the industrial environment 100 of FIG. 1, although the luminaire manager 300 may be additionally or alternatively utilized in other industrial environments. For example, a single instance of the luminaire manager 300 may calculate energy usage for one or more luminaires and/or control one or more luminaires in accordance with the techniques discussed herein. Further, although FIG. 3 depicts the luminaire manager 300 as a single computing device, in some embodiments the components of the luminaire manager 300 may be implemented in a group of computing devices, such as a bank of servers, a cloud computing system, one or more networked computing devices, etc. For ease of discussion, though, the luminaire manager 300 is discussed herein using the singular tense.

The luminaire manager 300 includes one or more network or communication interfaces 302 via which the luminaire manager 300 may communicatively connect to the data highway 122, the luminaire network servers 138, the PCS servers 140, and the ASM 145. Additionally, the luminaire manager 300 includes one or more processors 305 and one or more tangible, non-transitory memories 308 on which energy manager instructions 310 and optionally other instructions 312 are stored. The sets of instructions 310, 312 may be implemented as programs, applications, instructions, services, modules, routines, and the like, which may be executed by the one or more processors 305 to perform various tasks associated with detecting or determining light intensities, determining energy usage based on the light intensities, controlling luminaires based on the energy usage, determining energy savings and/or other analytics from the energy usage, and/or generating and displaying reports including the energy usage and/or energy savings information.

Figure 4A:
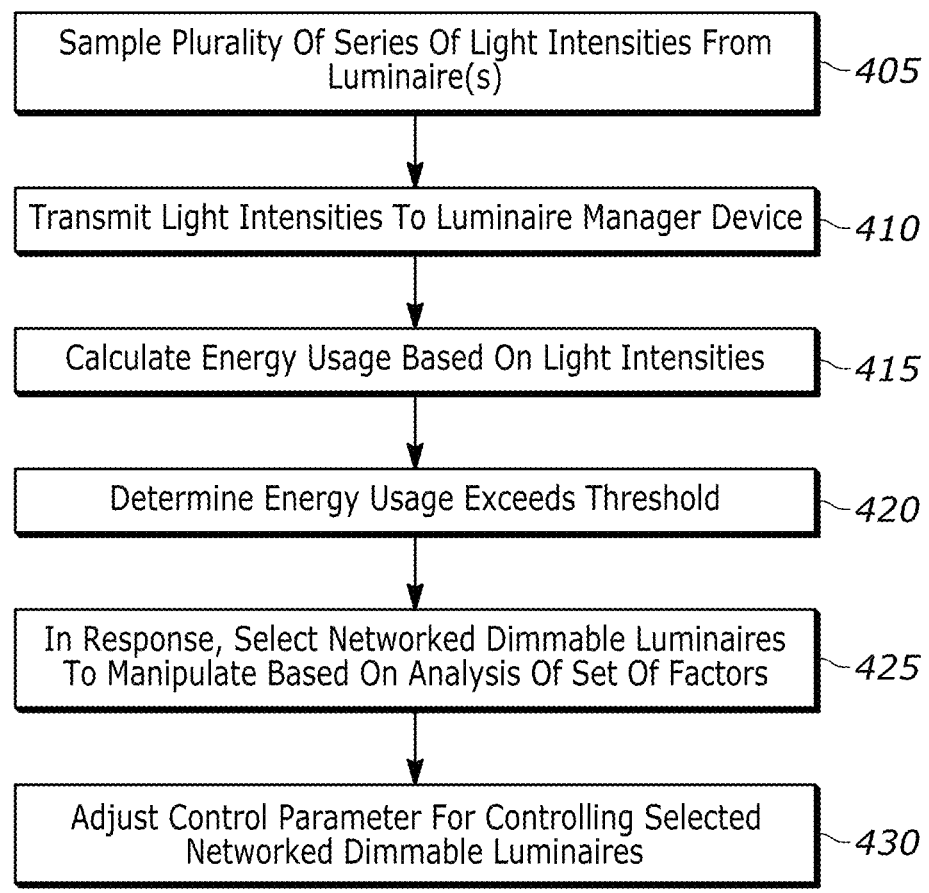
FIG. 4A depicts a flow diagram of an example method for monitoring energy usage by one or more luminaires based on light intensities provided by the luminaires and for controlling luminaire(s) based on the monitored energy usage.
Figure 4B:
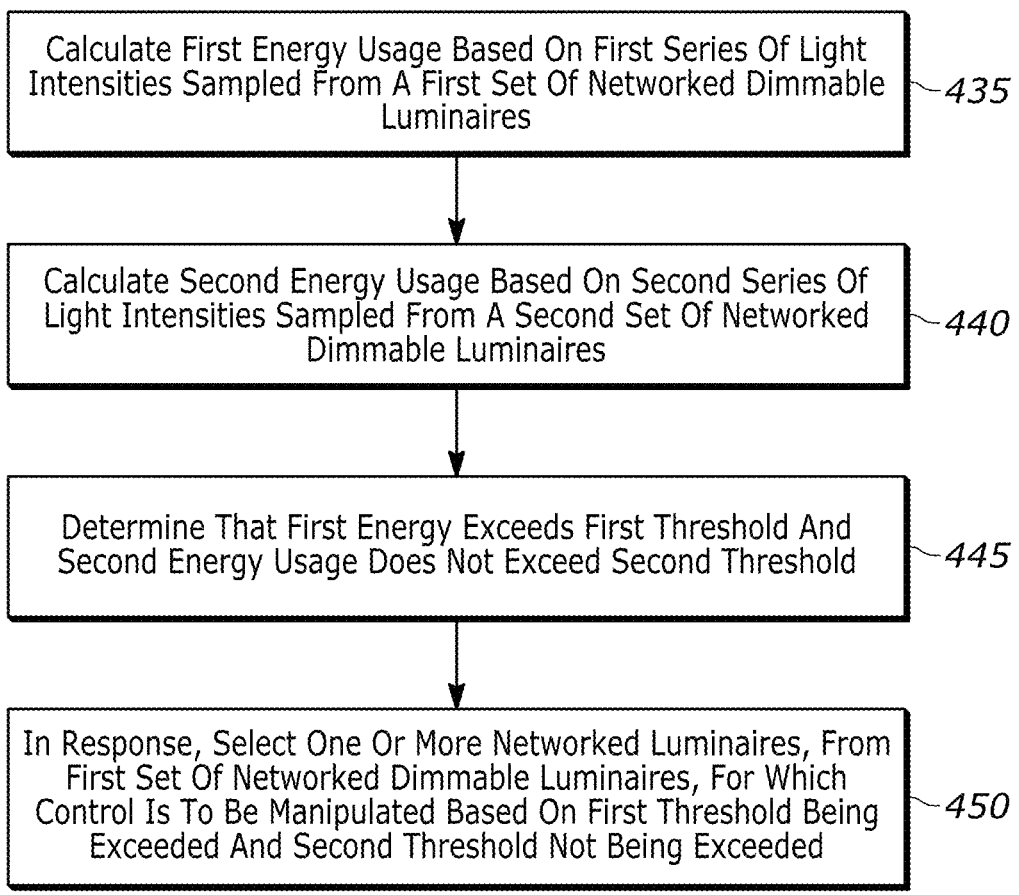
FIG. 4B depicts a flow diagram of an example method for selecting one or more networked dimmable luminaires for which control is to be manipulated.

For example, the energy manager instructions 310 may be executable by the one or more processors 305 to perform at least a portion of embodiments of the method 400 of FIG. 4A and/or the method 432 of FIG. 4B, and/or to perform at least portions of other methods of monitoring energy consumption by luminaires (e.g., by detecting or determining light intensities), controlling luminaires based on the energy consumption, analyzing energy savings based on the consumption. Additionally, the one or more memories 308 of the luminaire manager 300 may store energy manager data 315 and optionally other related data 318 utilized in conjunction with monitoring and/or controlling luminaires. For example, collected light sensor data, reported dimmer settings, light intensities, determined energy usage(s), calculated energy savings, generated reports, etc. may be stored as energy manager data 315.

Turning to FIG. 4A and FIG. 4B, FIG. 4A depicts a flow diagram of an example method 400 for monitoring energy usage by one or more luminaires based on light intensities provided by the luminaires and for controlling luminaire(s) based on the monitored energy usage, and FIG. 4B depicts a flow diagram of an example method 432 for selecting one or more networked dimmable luminaires for which control is to be manipulated. The methods 400 and/or 432 may be implemented, in whole or in part, by one or more of the luminaire managers 101 shown in FIG. 1, one or more of the luminaires 110 shown in FIG. 1, the luminaire 200 shown in FIG. 2, and/or the luminaire manager 300 shown in FIG. 3. The methods 400 and/or 432 may be saved to a memory as one or more instructions or routines, such as the instructions store to the memory 220 shown in FIG. 2 or the memory 308 shown in FIG. 3 (e.g., as the instructions 310). In an example implementation, the luminaire manager 300 performs at least a portion of the methods 400 and/or 432, e.g., by executing the instructions 310. For ease of discussion, and not for limitation purposes, this disclosure discusses the methods 400 and/or 432 with simultaneous reference to the industrial environment 100 of FIG. 1, the luminaire 200 of FIG. 2, and/or the luminaire manager 300 of FIG. 3, although the methods 400 and/or 432 may execute in environments other than the environment 100, in conjunction with luminaire nodes other than the luminaire nodes 200, and by computing devices other than luminaire manager 300. Additionally, in some embodiments, the methods 400 and/or 432 includes one or more alternate and/or additional actions other than those shown in FIG. 4A and FIG. 4B.

At a block 405, light intensities from one or more luminaires are sampled. The one or more luminaires may be instances of the luminaire 200, or some other type of luminaire. The sampled light intensities may be detected via a sensor of the luminaires, or may be determined based on a setting of the luminaires for dimming. For example, when a luminaire is configured to provide light at 50% of max light intensity, the luminaire may assume that the light intensity is this value (e.g., rather than directly measuring or sensing it). In some embodiments, the luminaires directly measure or sense the light intensity. The sampled light intensities may be measured in absolute terms such as lumens, footcandles (lumens per square foot), or lux (lumens per square meter); or in relative terms (e.g., a percent relative to a maximum potential light intensity for a given luminaire).

At a block 410, the sampled light intensities are transmitted to one or more luminaire manager devices. The sampled light intensities may be transmitted via any suitable message or signal. In an embodiment, the light intensities are transmitted via signal and/or message conforming to a process control protocol, such as WirelessHART. In addition to carrying the sampled light intensities, the signal and/or messages may carry include a corresponding time stamp or other suitable indication of a respective time/date of a sampled light intensity or set of light intensities. At a given luminaire, light intensities may be sampled and transmitted at any desired interval (e.g., every 1 minute, every 5 minutes, every 10 minutes, etc.). The interval may be determined by the protocol used for messaging. For example, WirelessHART may dictate that samples be obtained and transmitted every five minutes.

At a block 415, energy usage is calculated based on the sampled light intensities. An instantaneous energy usage calculation may be measured in W, kW, or kWh, and may be calculated by multiplying the sampled light intensity or "PV" (e.g., 50%) and the wattage for which the luminaire is rated (e.g., 60 W) (e.g., resulting in an energy usage of 30 W). To calculate the instantaneous energy usage for multiple lights, the luminaire manager(s) may use equation (1) below, where "PV" is the sampled light intensity and wherein "Wattage" is the wattage for which the luminaire is rated:

$$(PV_1 \times Wattage_1) + (PV_2 \times Wattage_2) + \ldots + (PV_i \times Wattage_i) \qquad (1)$$

To calculate the instantaneous energy savings for the same set of lights, luminaire manager(s) may use equation (2) below:

$$100 - \frac{(PV_1 \times Wattage_1) + (PV_2 \times Wattage_2) + \ldots + (PV_i \times Wattage_i)}{(Wattage_1) + (Wattage_2) + \ldots + (Wattage_i)} \qquad (2)$$

As noted, light intensities may be sampled at any desired interval. When light intensity is sampled every 5 minutes, a given luminaire may gather 12 samples over the course of 1 hour. In such a scenario, the energy usage per hour (kWh) for the luminaire may be calculated using equation (3) below:

$$\frac{(PV_1 \times Wattage_1) + (PV_2 \times Wattage_2) + \ldots + (PV_{12} \times Wattage_{12})}{12} \qquad (3)$$

Similarly, energy usage per hour (kWh) for i luminaires may be calculated using equation (4) below:

$$\sum \left( \frac{(PV_1 \times Wattage_1) + (PV_2 \times Wattage_2) + \ldots + (PV_{12} \times Wattage_{12})}{12} \right)_i \qquad (4)$$

When calculating the energy usage for a given time period for multiple luminaires or for multiple sets of luminaires, the energy usage may be referred to as a totaled energy usage. In embodiment, energy usage is calculated at multiple levels. For example, energy usage may be calculated per luminaire. Alternatively or additionally, energy usage may be calculated per set or zone (e.g., per floor). For example, a first zone may have a first energy usage, a second zone may have a second energy usage, and the luminaire manager may calculate a totaled energy usage based on the first and second energy usages. Alternatively or additionally, an energy usage may be calculated for an entire site or plant, or for multiple sites or plants. If desired, a threshold and/or budget may exist for each level of energy usage calculation.

At a block 420, the luminaire manager(s) determine that the energy usage exceeds a threshold, as discussed in greater detail with respect to FIG. 4B. The threshold may be any desired value, and may be set by a user. The threshold may be a rolling average. For example, a zone or set of lights may have a threshold of 75% energy usage for any given 24-hour period.

At a block 425, the luminaire manager(s) respond to determining that the threshold is exceeded by selecting one or more networked dimmable luminaires to manipulate to drive the energy usage down, as discussed in greater detail with respect to FIG. 4B. The factors may include sensed motion, light schedules, worker schedules, etc. For example, the luminaire manager may select one or more luminaires in an area where no recent motion has been detected and/or where workers are not scheduled to work.

At a block 430, the luminaire manager(s) adjust one or more control parameters for controlling the selected one or more networked dimmable luminaires. For example, the control parameters may include dimming or light intensity setting, or an on/off setting. The control parameters may be commands that are transmitted to the relevant luminaires, causing them to adjust their light levels accordingly. In some instances, a user may manually adjust the control parameter(s). In some instances, the luminaire manager(s) automatically adjust the control parameter(s) without user intervention.

Turning to FIG. 4B, in some examples, the plurality of networked dimmable luminaires includes a first set of dimmable luminaires and a second set of dimmable luminaires. As shown in the method 432, determining that the energy usage during the time period exceeds the threshold (e.g., as discussed with respect to block 420 above) may include calculating (block 435) a first energy usage, during the time period, based on a first series of light intensities sampled from the first set, calculating (block 440) a second energy usage, during the time period, based on a second series of light intensities sampled from the second set, and determining (block 445) that the first energy usage exceeds a first threshold and that the second energy usage does not exceed a second threshold. Selecting the one or more networked dimmable luminaires for which control is to be manipulated (e.g., as discussed with respect to block 425 above) may include selecting (block 450) the one or more networked dimmable luminaires from the first set based on the first threshold being exceeded and the second threshold not being exceeded.

Figure 5:
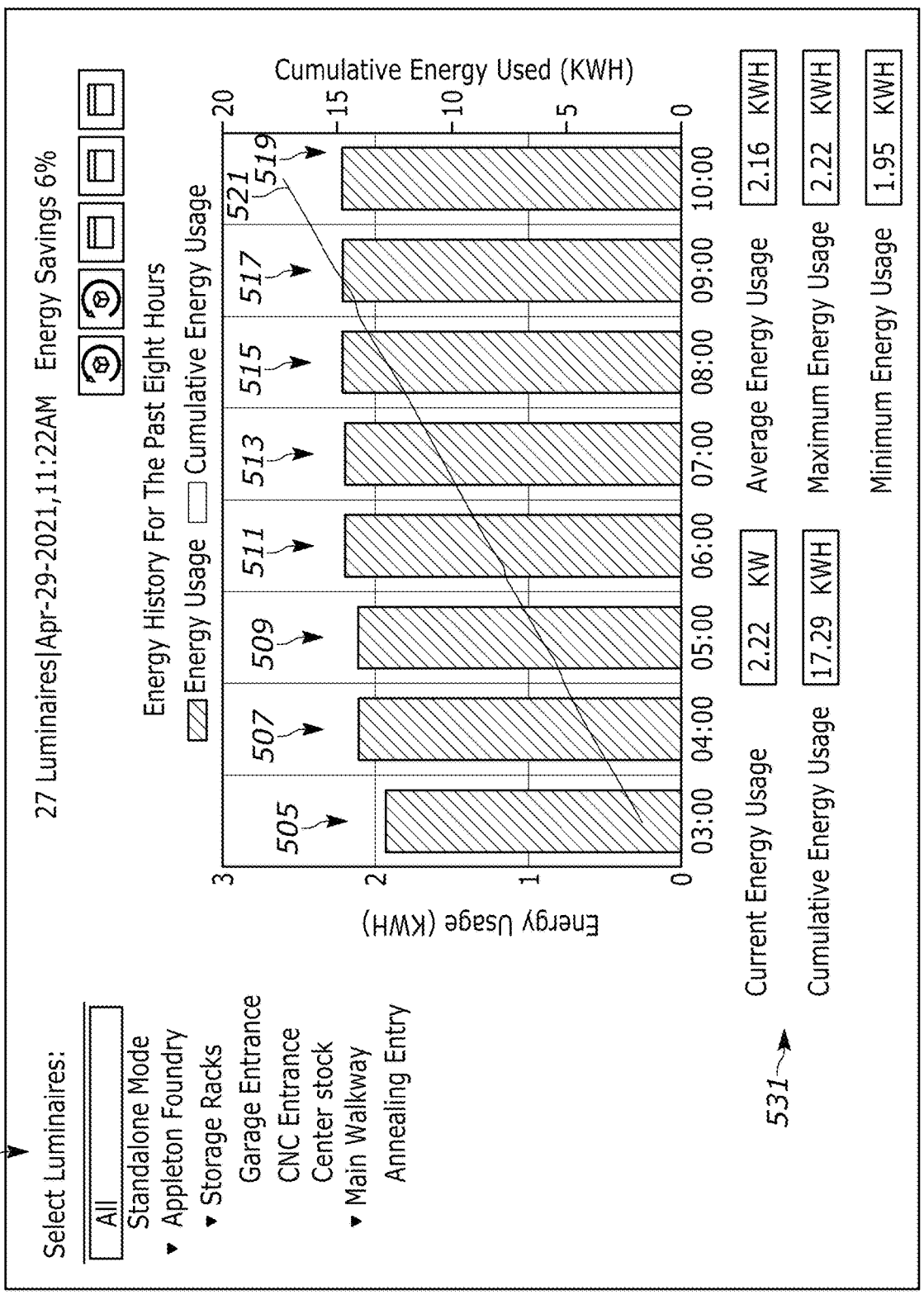
FIG. 5 is an example GUI that may be provided by a luminaire manager device, such as those shown in FIGS. 1 and 3, to display energy usage information.

FIG. 5 is an example GUI 500 that may be provided by a luminaire manager device, such as the device 300, to display energy usage information. In the shown example, the GUI 500 displays energy history for the past eight hours for a set of luminaires. Specifically, the GUI 500 provides bars 505-519 showing energy usage per hour for a given set of luminaires. The trend line 521 depicts a cumulative energy usage, accumulating over the hours 505-519. The energy metrics 531 depict various energy usage information, such as current energy usage, cumulative energy usage, average energy usage, maximum energy usage, and minimum energy usage. A user may interact with the luminaire selection area 501 to select the particular luminaire or set of luminaires for which the GUI 500 should provide information.

Figures 6, 7:
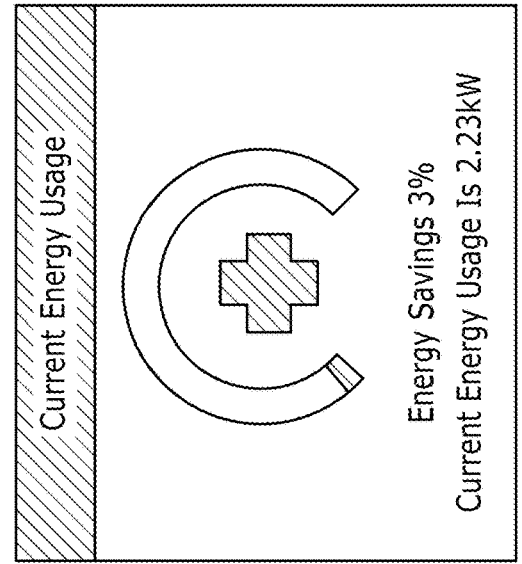
FIG. 6 is an example GUI element configured to provide energy savings information.
FIG. 7 is an example GUI element configured to provide information regarding the environmental impact of energy saved when implementing the techniques discussed herein.

FIG. 6 is an example GUI element 600 configured to provide energy savings information. The GUI element 600 may be provided by a luminaire manager device, such as the device 300, to depict energy savings over any desired period of time. As shown, the element 600 depicts an energy savings of 3%. For example, if a set of luminaires has a maximum potential energy consumption of 1000 W over a given time period, the element 600 may be shown in response to the set of luminaires consuming 970 W over the given time period (e.g., indicating an energy savings of 3% relative to the potential maximum).

FIG. 7 is an example GUI element 700 configured to provide information regarding the environmental impact of energy saved when implementing the techniques discussed herein. The element 700 may be provided by a luminaire manager device, such as the device 300, to depict the environmental impact of energy savings 702 (e.g., calculated based on energy usage calculation made by the device 300). The element 700 may be useful to help a person understand environmental impacts equivalent to the energy savings 702.

For example, an equivalent 704 reduction in carbon dioxide may be shown (e.g., calculated based on a known carbon dioxide emission per kWh generated for a typical power plant). An equivalent 706 in annual household electricity usage saved may be shown (e.g., calculated based on an average kWh consumed per year by an average US household). An equivalent 708 in acres of tree planted may be shown (e.g., calculated based on an average reduction in carbon dioxide for an acre of trees planted and a known carbon dioxide emission per kWh generated for a typical power plant). An equivalent 710 in reduction of coal emissions may be shown (e.g., calculated based on average coal emissions associated with a kWh of power generated). An equivalent 712 in fewer miles driven may be shown (e.g., calculated based on an average carbon dioxide emission for each mile driven by an average car and a known carbon dioxide emission per kWh generated for a typical power plant).

The following additional considerations apply to the foregoing discussion.

A user interface device, personal electronic device, or portable computing device, such as the devices 150*b*, 150*c*, 150*d*, which may operate in conjunction with embodiments of methods, systems, luminaires, and computing devices disclosed herein, can be any suitable device capable of wireless communications such as a smartphone, a tablet computer, a laptop computer, a wearable or body-borne device, a drone, a camera, a media-streaming dongle or another personal media device, a wireless hotspot, a femtocell, or a broadband router. Further, the portable computing device and/or embodiments of the disclosed luminaire can operate as an internet-of-things (IoT) device or an Industrial internet-of-things (IIoT) device.

Certain embodiments are described in this disclosure as including logic or a number of components or modules. Modules may be software modules (e.g., code stored on non-transitory machine-readable medium) or hardware modules. A hardware module is a tangible, non-transitory unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for the embodiments of the luminaires, systems, and computing devices disclosed herein through the principles disclosed in this disclosure. Thus, while this document illustrates and describes particular embodiments and applications, the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

What is claimed:

1. A method for controlling networked dimmable luminaires in an energy efficient manner, the method comprising:
sampling, by a plurality of networked dimmable luminaires included in a luminaire network for an industrial environment, a plurality of series of light intensities during a period of time, each of the series of light intensities sampled by a different one of the plurality of networked dimmable luminaires included in the luminaire network for the industrial environment;
transmitting, by the plurality of networked dimmable luminaires included in a luminaire network for an industrial environment, the plurality of series of light intensities sampled to one or more luminaire manager devices, via process control messages which are adapted to carry process variables for controlling an industrial process;
determining, by the one or more luminaire manager devices, based on the plurality of series of light intensities sampled, that an energy usage during the time period of time exceeds a threshold set by a user; and
responding, via the one or more luminaire manager devices, to determining the energy usage exceeds the threshold set by the user, including:
(i) selecting, based on an analysis of a set of factors associated with each networked dimmable luminaire, one or more networked dimmable luminaires for which control can be manipulated to drive the energy usage below the threshold set by the user; and
(ii) adjusting a control parameter for controlling the selected one or more networked dimmable luminaires to drive the energy usage below the threshold set by the user, wherein the selected one or more networked dimmable luminaires are controlled in accordance with the adjusted control parameter.

2. The method of claim 1, wherein the plurality of networked dimmable luminaires includes a first set and a second set, wherein the determining by the one or more luminaire manager devices, that the energy usage during the period of time exceeds the threshold set by the user comprises:
calculating a first energy usage, during the period of time, based on a first series of light intensities sampled from the first set;

calculating a second energy usage, during the period of time, based on a second series of light intensities sampled from the second set; and determining that the first energy usage exceeds a first threshold and that the second energy usage does not exceed a second threshold;

wherein selecting the one or more networked dimmable luminaires for which control can be manipulated includes selecting the one or more networked dimmable luminaires from the first set based on the first threshold being exceeded and the second threshold not being exceeded.

3. The method of claim 1, wherein the plurality of networked dimmable luminaires includes a first set and a second set, wherein the energy usage is a totaled energy usage, and wherein determining that the energy usage during the period of time exceeds the threshold set by the user comprises:

calculating a first energy usage, during the period of time, based on a first series of light intensities sampled from the first set; and calculating a second energy usage, during the period of time, based on a second series of light intensities sampled from the second set;

determining the totaled energy usage based on the first and second energy usages; and determining that the totaled energy usage exceeds the threshold set by the user.

4. The method of claim 1, wherein the set of factors associated with each networked dimmable luminaire comprises an energy budget for each networked dimmable luminaire.

5. The method of claim 1, wherein the set of factors associated with each networked dimmable luminaire comprises a light intensity, a light schedule, a motion sensitivity, or a light sensitivity.

6. The method of claim 1, further comprising calculating and storing to memory a maximum energy usage or a minimum energy usage determined from the plurality of series of light intensities.

7. The method of claim 1, wherein adjusting the control parameter comprises adjusting the control parameter to a value selected by a user.

8. The method of claim 1, wherein adjusting the control parameter comprises the computing device automatically adjusting the control parameter based on the results of the analysis.

9. The method of claim 1, wherein the control parameter is a light intensity or a light schedule.

10. The method of claim 1, wherein the control parameter is a sensitivity to light or a sensitivity to motion that is utilized to activate a light source of the one or more networked dimmable luminaires.

11. The method of claim 1, wherein the energy usage is a totaled energy usage and wherein the method further comprises:

calculating a plurality of energy usages, including one for each of the plurality of networked dimmable luminaires; and calculating the totaled energy usage by summing the plurality of energy usages.

12. The method of claim 1, further comprising calculating an energy savings for the plurality of networked dimmable luminaires based on the energy usage and a maximum energy usage for the plurality of networked dimmable luminaires.

13. The method of claim 1, wherein the plurality of sets of networked dimmable luminaires are further configured to communicate according to a schedule defined by a network manager, wherein the sampling the plurality of series of light intensities includes each luminaire, of the plurality of networked dimmable luminaires, receiving a command, via the process control messages, instructing the luminaire to transmit a light intensity included in the plurality of series of light intensities.

\* \* \* \* \*